Patented June 19, 1951

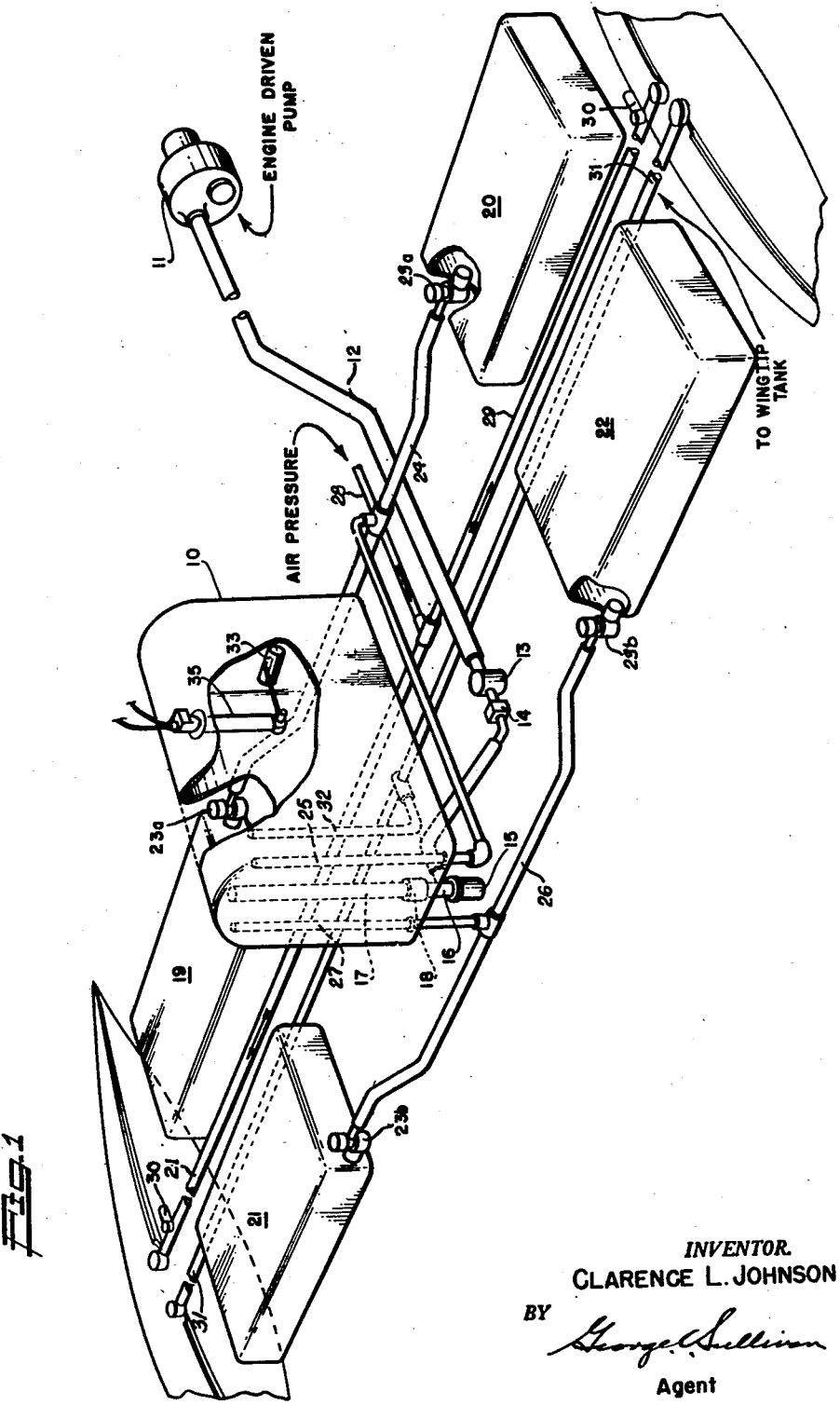

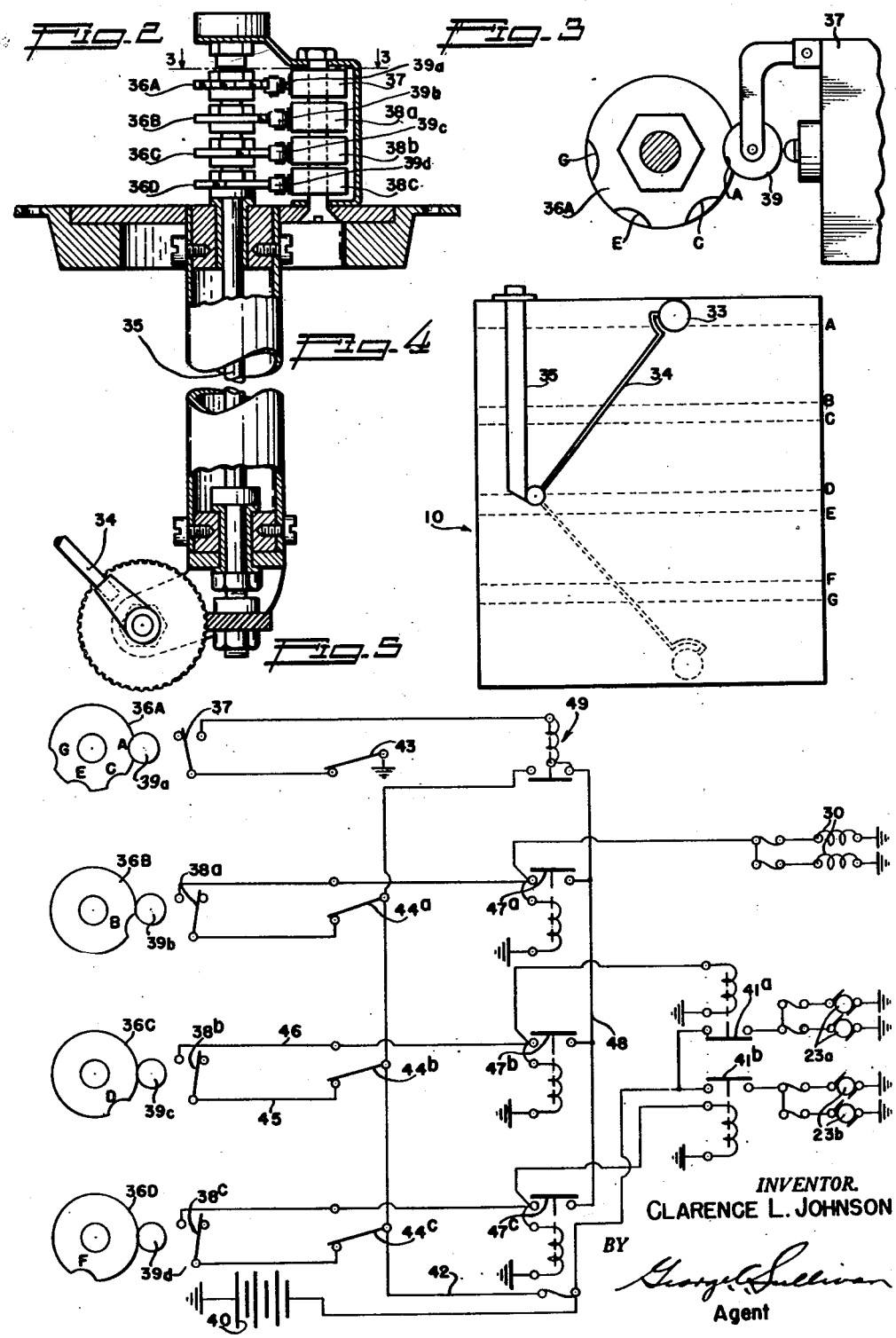

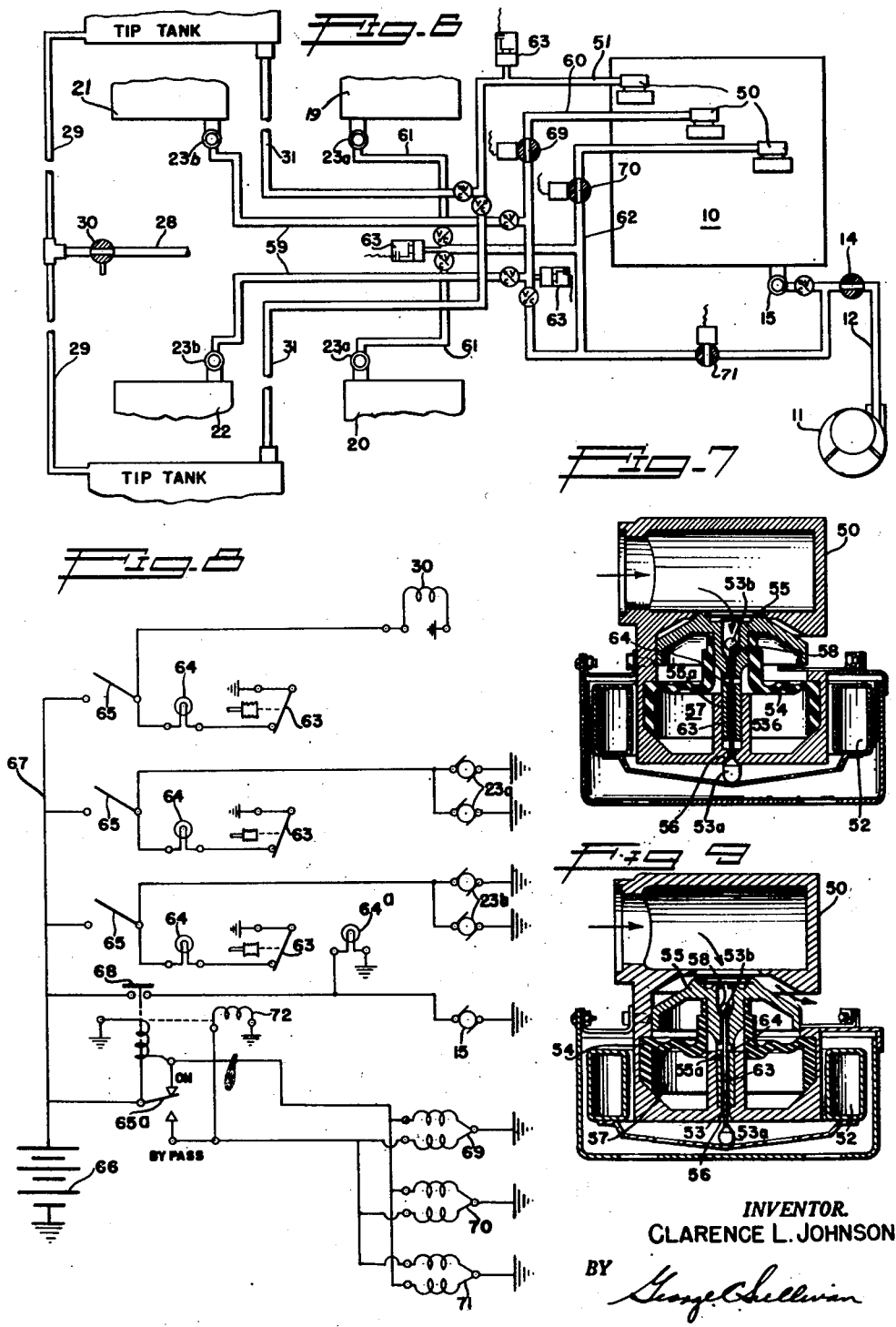

2,557,438

UNITED STATES PATENT OFFICE 2,557,438

FUEL TRANSFER SYSTEM, INCLUDING AUTOMATIC AND SEQUENTIAL SELECTION OF FUEL TANKS

Clarence L. Johnson, Encino, Calif., assignor to Lockheed Aircraft Corporation, Burbank, Calif.

Application June 18, 1945, Serial No. 600,101

7 Claims. (Cl. 158—36.4)

This invention relates to an improved fuel system for automatically and sequentially selecting the tanks from which fuel is supplied to the power plant.

While the invention will be illustrated and described in connection with aircraft fuel systems wherein fuel storage is broken up into a number of units, my invention is not limited thereto since it is directed to maintaining a constant liquid supply from a plurality of liquid containers. In a conventional aircraft fuel system a number of fuel tanks are disposed in the wings and elsewhere and it is the pilot's responsibility to manually switch over from one tank to another to maintain the fuel supply to the power plant. While it is necessary to maintain the supply it is also necessary to consider the weight of the tanks in order to maintain the trim of the airplane and/or to first use up the fuel in droppable tanks in the event such auxiliary tanks are in use. Since the pilot of a single-place combat airplane has other things on his mind besides manually switching from one tank to another at the proper time, it frequently happens that he lets the engine run out of fuel before switching over to the supply remaining in other tanks. With conventional aircraft power plants this may not be fatal, since usually the airflow is capable of restarting the engine when fuel is again supplied thereto, but with certain jet propulsion power plants now going into use, even a momentary interruption of the fuel supply will prevent restarting of the power plant while in flight. In either case, however, the interruption of fuel supply is highly undesirable and the possibility thereof imposes a mental strain on the pilot.

It is, accordingly, among the objects of this invention to provide a multiple tank fuel system from which the flow of fuel will be automatically maintained, while securing the desired sequencing in the emptying of the several tanks, maintaining proper balance between the several tanks as they are successively emptied, providing manual overrides enabling the pilot to empty any tank in advance of its selected sequence and/or to manually control the operation of the system, and to provide a central sump tank automatically refilled from the various storage tanks.

Other and further objects of this invention will become apparent as the description of the chosen embodiments proceed.

I have chosen to illustrate two versions of my invention as applied to an airplane fuel system, wherein a plurality of fuel tanks are arranged to supply a single power plant, but I desire to emphasize that multiple power plants can be readily supplied either by separate or cross-connected fuel systems embodying the systems herein described.

In the drawings:

Figure 1 is a diagrammatic perspective view of a multiple fuel tank system embodying an electrical control version of this invention.

Figure 2 is an enlarged elevational view, partly broken away to show details of the float controlled sequence switches arranged in the central sump or main tank.

Figure 3 is an enlarged section on the line 3—3 of Figure 2 showing the sequence cams which selectively energize the several pump switches.

Figure 4 is a diagrammatic side view of the sump or main tank and float valve to show the various fuel levels therein at which the several pump switches are sequentially energized.

Figure 5 is a wiring diagram of the electrical sequence and overriding systems controlling the operation of the individual tank transfer pumps.

Figure 6 is a diagram of a modified form of sequencing control wherein the float operated electrical control of the first form is replaced with a hydraulic control system.

Figure 7 is an enlarged sectional view through one of the automatic float valves of Figure 6.

Figure 8 is a schematic wiring diagram of the electrical system energizing the pumps and bypass valves of Figure 6.

Figure 9 is a view similar to Figure 7 showing the valve in its open position.

As shown on the drawings, the fuel supply is intended to be carried in several wing and auxiliary tanks. In the prototype installation droppable wing-tip tanks were arranged to have their fuel transferred by imposing air pressure thereon, while the built-in tanks shown had individual fuel transfer pumps. As a matter of convenience I have, therefore, shown solenoid operated air valves for the wing-tip tanks, the electric circuits and operation being substantially the same as for the electrically driven transfer pumps.

In the multiple tank installation of Figure 1, a central sump or main tank 10 may conveniently be installed in the airplane fuselage, desirably but not necessarily elevated relative to the wing. The power plant or engine draws fuel from the tank 10 by the usual engine driven fuel pump 11 connected to the tank 10 by a pipe 12 having a filter 13 and manual shut-off valve 14 therein. As shown, a booster pump 15 is installed at the tank outlet 16 which incorporates a standpipe 17 within the tank. The standpipe 17 has an inverted flight valve 18 near the bottom thereof which valve is formed by a slidable sleeve which in the position shown uncovers orifices in the standpipe near the bottom thereof but slides on the standpipe to cover such orifices to cause fuel to be drawn through the open end of the standpipe when the tank and airplane are in inverted flight position.

A plurality of other tanks 19, 20, 21 and 22 may conveniently be built into the airplane wings or elsewhere and when not located at the center of gravity of the aircraft are preferably so connected as to be operated in opposed pairs to maintain lateral or longitudinal balance of the aircraft. While it will be evident that each such tank can be separately drawn on, or that more than two tanks may be drawn on simultaneously, I have chosen to show pairs of complementary tanks connected for simultaneous supply to the main or sump tank. Also, while a single transfer pump would serve both such tanks I prefer to provide individual transfer pumps therefor to assure equal withdrawals from each tank and to prevent cross flow. Thus tanks 19 and 20 in Figure 1 are each provided with fuel transfer pumps 23ᵃ feeding into a common pipe 24 discharging through a standpipe 25 internally of the main tank 10. Similarly, tanks 21 and 22 each have transfer pumps 23ᵇ feeding into a common pipe 26 and a standpipe 27. As will later appear, the transfer pumps of each of a pair of complementary tanks are preferably energized simultaneously. Alternatively, a single transfer pump can be used for each pair of complementary tanks.

If temporary and/or auxiliary tanks are used, such for example as the droppable wing-tip fuel tanks disclosed in my copending application Serial No. 535,307 filed May 12, 1944, now Patent No. 2,421,699, it is convenient to transfer fuel therefrom by imposing air pressure on the fuel therein. To provide for such tanks, I show a pressure airline 28 supplying air thereto through conduits 29, each controlled by an electric solenoid operated valve 30 (Figure 6). Fuel from each tanks is brought to the sump or main tank 10 through conduits 31 and a standpipe 32.

If droppable or other types of temporary or auxiliary tanks are provided it is desirable to use up the fuel therein before drawing on the fuel in the built-in tanks. However, it will be evident from what follows that the exact sequence of use of the various tanks can be changed at will by merely changing the electric connections to the several pairs of transfer pumps 23 and/or solenoid valves 30.

In Figures 2 to 4 inclusive, I have shown a float mechanism associated with the sump or main tank 10 wherein a float 33 carried on a pivoted arm 34 rotates a shaft 35 which extends out of the top of the tank 10 and carries a series of sequentially positioned cams 36A, 36B, 36C and 36D, which operate to close switches 37 and 38A, 38B and 38C mounted alongside the shaft 35. This sequential positioning of the several cams results in the selective and sequential closing of the several switches as the fluid level varies in the tank 10. As shown in Figure 5 the first or top switch 37 is a shut-off switch controlling the other three switch circuits.

As shown in Figure 4 the several tanks are selectively or sequentially drawn on as the liquid level in the main or sump tank falls to successive stages indicated by the several dotted lines. The droppable wing tanks are drawn on when the level falls to the line B and supply fuel until the level rises to the line A, then shutting off until the level again falls to the line B. This intermittent operation continues until the first pair of tanks are empty when the main tank level falls further to the line D where the transfer pumps of the second pair of tanks are energized to refill the main tank to the level C. This operation continues intermittently until the second tanks are empty whereupon the liquid level falls further to the line F, energizing the transfer pumps of the third pair of tanks to refill the main tank to the line E, this operation continuing intermittently. The line C represents the final shut-off point for the tip tanks, the line E for the second pair of tanks, and the line G for the third pair of tanks, so that when the fuel in the main tank falls to the line G the fuel transfer controls are entirely shut off, while a reserve of fuel in the main tank 10 is available for continued operation of the power plant.

In the wiring diagram of Figure 5, the several cams 36A, 36B, 36C and 36D are diagrammatically shown in the position determined by the liquid level A in Figure 4. The cams are designed to rotate counterclockwise as the liquid level falls. The top cam 36ᵃ operates as a shut-off for the circuits controlled by the other cams and actuates the normally open switch 37 through a follower 39, the follower dropping into notches, marked A, C, E and G corresponding to the "shut off" liquid levels previously described, to break the circuits energizing the solenoids and transfer pumps. The other three cams 36B, 36C and 36D are identical except for the position of the notches, marked B, D and F respectively, which allow the respective switch followers 39 with similar subscripts to close the respective switches 38.

In the wiring diagram I have chosen to illustrate interconnected control and power circuits for the transfer pumps, while the control circuit is connected directly to the solenoid valves 30. Thus the transfer pumps are connected to a battery 40 through power relays 41A and 41B which latter are selectively closed by impulses through a control circuit also energized by the battery 40. Aside from the addition of the power relays, the three tank circuits are identical so that a description of one will serve for all.

Accordingly, the control and power circuit for the first pair of fixed tanks will be described at this point. The circuit will first be energized when the main tank level falls to the line D at which point the cams have rotated counter-clockwise until the follower 39ᶜ has dropped into the notch D of the third cam 36ᶜ, closing the switch 38ᵇ. The control circuit then is made from the battery 40 through wire 42, manual switch 44ᵇ, wire 45, cam switch 38ᵇ, and wire 46 to a locking relay 47ᵇ and also the power relay 41ᵃ, completing the circuit to the fuel transfer pumps 23ᵃ for tanks 19 and 20. The locking relay 47ᵇ closes a circuit to a bus bar 48 leading to a locking relay 49 in circuit with the first or off switch 37. The follower 39ᵃ will have ridden up on the maximum diameter of its cam 36ᵃ between notches C and E for the specified conditions, thus closing switch 37 and completing a circuit from the relay to ground through the manual switch 43. The relay 49 also closes a circuit from the bus bar or line 42 to the bus bar 48 which energizes the locking relay 47ᵇ to hold it closed in spite of the reopening of the switch 38ᵇ as its follower climbs out of the cam notch D as the main tank refills. Thus the transfer pumps remain energized until the tank refills to the line C when the first or "off" switch 37 is opened to restore the system to neutral, ready for further operations when the tank level again falls to the energizing level.

The manual switches mentioned permit overriding the automatic controls. If switch 43 alone is opened the entire system is cut out. If 43 is opened and any one of the other manual double throw switches 44A, 44B, or 44C is shifted to its upper position the corresponding transfer pumps or solenoid valves are energized at will, regardless of the cam positions.

The second embodiment of this invention, shown in Figures 6 to 9 inclusive of the drawings, utilizes the same arrangement of tanks as previously described, so that the same reference numerals are applied to the showings of Figure 6 including the various tanks and fuel transfer pumps.

The sequence of emptying the several pairs of tanks remains the same but is under the control of automatic float operated inlet valves generally indicated by the numeral 50 and shown in detail in Figures 7 and 9. These float valves are located at various heights in the main or sump tank so that the highest float valve, shown as connected to the tip tanks through conduit 51 and the conduits 31, will allow the tip tanks to empty before the next lower float valve allows delivery from the next pair of tanks 19 and 22.

The float valve 50 consists essentially of an annular float 52 within a shield, the float controlling a double headed pilot valve 53 centrally of a poppet valve 55. When the fuel level lifts the float 52 the lower head 53ª on the pilot valve engages a seat 56 to close a drain passage 63 in the stem 55ª of the valve 55, which drain passage connects through a cross passage 64 with a chamber 57 beneath a flexible diaphragm 54 connected between the valve stem 55ª and the wall of the chamber 57. At the same time such lifting of the pilot valve 53 lifts its upper head or check valve 53ᵇ from its seat 58 in the stem to admit pressure into the chamber 57 through the stem of the valve 55. Such pressure in the chamber 57 forces the valve 55 up against its seat to shut off the flow of fuel. The valve 50 is shown in its closed position, as above described, in Figure 7; and in its open position in Figure 9, where the float 52 has lowered to unseat the lower head 53ª and seat the upper or check head 53ᵇ of the pilot valve 53. Thus the chamber 57 drains past the lower head and allows the poppet valve 55 to open in response to the pressure of fuel thereagainst, delivering fuel into the tank 10. An appreciable time delay is involved in both opening and closing the valve 55 due to the restricted passages, so that the float valves 50 operate intermittently with a substantial variation in fuel level in the main tank between their opening and closing positions. This is desirable in order to increase the time cycle of operation thereof.

The fuel transfer pumps 23ᵇ in the leading edge tanks 21 and 22 deliver fuel through conduits 59 and 60 to the second float valve. Similiarly the pumps 23ª for the main wing tanks 19 and 20 feed through conduits 61 and 62 to the lowest float valve. The check valves shown prevent cross or back flow in the several pairs of tanks.

In this form of the invention I contemplate turning on all the transfer pumps and wing-tip tank solenoid simultaneously, so that the three float valves will all be subject to fuel pressure until the corresponding tanks are emptied. In so doing I take advantage of the fact that the fuel transfer pumps will deliver more pressure when charged with fuel than when sucking air. Also, the tip tank fuel lines show a corresponding pressure drop between carrying fuel and when air is flowing to the float valve, because the air supply is limited both as to volume and pressure. Accordingly I provide pressure responsive switches 63 in each of the fuel lines to the float valves, so arranged that a pressure drop allows the switch to close and to light signal lights 64 adjacent manual switches 65 which the pilot closes to open the solenoids 30 and start the transfer pumps 23. With this arrangement, closing the manual switches 65 temporarily energizes the signal lights 64 until fuel pressure has built up to the proper value at the float valves whereupon the lights go out until the tanks are empty at which time the lights come in again to indicate that the respective switches can be opened to close the solenoid valve 30 and/or stop the transfer pumps 23 as the lights may indicate, in order to relieve the electrical system of the continuing load of electrical apparatus associated with empty tanks. Accordingly, the signal lights indicate both initial malfunctioning and tank emptying.

A simplified or schematic wiring diagram is shown in Figure 8 wherein a battery 66 is connected through a bus bar 67 to four manual switches 65, three of which energize the solenoid valves 30 and transfer pumps 23 while the fourth switch 65ª energizes the main tank pump 15 through a latching relay 68. This last switch is a selector switch and turns on an indicator light 64ª, the switch in its "on" position momentarily energizes three solenoid bypass valves 69, 70 and 71 (Figure 6) into the position for normal sequential operation; valves 69 and 70, in conduits 60 and 62 respectively, being open, while valve 71, in a bypass conduit from 60 and 62 around the tank 10 to the conduit 12, is closed. When switch 65ª is momentarily moved to the "bypass" position these valves are simultaneously reversed so that the two pairs of wing tanks feed direct to the engine fuel pump, as would be desirable in the event of trouble or damage to the main tank 10. At the same time the latch 72 on the relay 68 is released to stop the main pump 15. When utilizing the bypass arrangement the pilot can select the tanks he desires to empty by energizing the corresponding transfer pumps, or he can energize all at once if he so desires; and he can also manually select any of the tanks for operation out of their normal sequence.

It will thus be seen that I have invented improved multiple tank fuel supply systems wherein the transfer of fuel is automatically and sequentially controlled to eliminate the possibility of an inadvertent interruption of the fuel supply to a power plant or engine, and in which a manual overriding control is provided to permit either selective withdrawal of fuel from any of the tanks regardless of the sequential relationship of the automatic controls, or to bypass the sump tank and supply fuel direct to the engine.

Having thus described my invention and the present preferred embodiments thereof, I desire to emphasize the fact that many modifications may be resorted to in a manner limited only by a just interpretation of the following claims.

I claim as my invention:

1. In a fuel system including a main tank and a plurality of storage tanks, means for supplying fuel from said main tank to the point of use thereof, means for transferring fuel from each of said storage tanks to said main tank, and control means for said fuel transferring means including means responsive to variations in the fuel level in said main tank for sequentially and separately controlling fuel delivery by said fuel transferring means associated with the several storage tanks as the fuel level in said main tank falls to predetermined successive levels, and means for maintaining the delivery from the selected fuel transferring means until the main tank has been refilled to a predetermined level whereby to intermittently and sequentially deliver fuel through each transferring means over a separate predetermined range of fuel levels in said main tank until the storage tank associated with the selected fuel transferring means has been emptied.

2. In a fuel system including a main tank and a plurality of storage tanks, means for supplying fuel from said main tank to the point of use thereof, means for transferring fuel from each of said storage tanks to said main tank, and control means for said fuel transferring means including means for sequentially and separately transferring fuel from the several storage tanks as the fuel level in said main tank falls to predetermined successive levels, and means for maintaining the transfer of fuel therethrough until the main tank has been refilled to a predetermined level whereby to intermittently transfer fuel from a given tank over a predetermined range of fuel levels in said main tank until the storage tank associated with the selected fuel transferring means has been emptied, and manual overriding means for selective energization of any of said fuel transferring means at will.

3. In a liquid supply system including a main tank and a plurality of storage tanks divided into groups arranged for individual liquid supply to said main tank, liquid transfer means associated with said storage tanks and interconnected for simultaneous operation in each group and selective operation as between groups, and means responsive to varying liquid levels in said main tank for sequentially energizing the liquid transfer means of predetermined groups of storage tanks as the liquid level in said main tank progressively decreases, and means for maintaining the energization of the liquid transferring means until the main tank has been refilled to a predetermined level whereby to intermittently and selectively actuate each liquid transferring means over a different predetermined range of liquid levels in said main tank until the storage tank associated with the liquid transferring means being energized has been emptied.

4. In a liquid supply system including a main tank and a plurality of storage tanks arranged for individual liquid supply to said main tank, liquid transfer means associated with said storage tanks and interconnected for simultaneous operation in each group and selective operation as between groups, and means responsive to varying liquid levels in said main tank for sequentially initiating the liquid transfer from predetermined storage tanks as the liquid level in said main tank progressively decreases, and means for maintaining the flow of liquid until the main tank has been refilled to a predetermined level, whereby to intermittently actuate each liquid transferring means over a predetermined range of liquid levels in said main tank until the selected storage tank has been emptied, and manual overriding means for selective energization of any of said liquid transferring means at will.

5. In a fuel supply system in an airplane including a main tank, a plurality of storage tanks divided into groups arranged for individual fuel supply to said main tank and each group comprising tanks symmetrically arranged with respect to said airplane for purposes of balance, and fuel transfer means associated with said storage tanks and interconnected for simultaneous operation in each group and selective operation as between groups, said fuel transferring means including float means responsive to successive predetermined decreasing fuel levels in said main tank, said float means being operatively connected with said fuel transfer means to sequentially and separately energize and deenergize the means for transferring fuel from each group of said storage tanks in a predetermined sequence such that said storage tanks will be sequentially emptied in groups as the fuel level in said main tank decreases.

6. An airplane fuel system comprising a main tank and a plurality of storage tanks, means for supplying fuel from said main tank to the point of use thereof, means for transferring fuel from each of said storage tanks to said main tank, and control means for said fuel transfer means including a plurality of independently-operable floats arranged at different levels in said main tank and associated with different of said storage tanks, said floats being adapted at said levels to sequentially and separately energize and deenergize the means for transferring fuel from each of said storage tanks in a predetermined sequence such that said storage tanks will be sequentially emptied as the fuel level in said main tank lowers.

7. An airplane fuel system including a main tank and a plurality of storage tanks, means for supplying fuel from said main tank to the point of use thereof, means for transferring fuel from each of said storage tanks to said main tank, and a plurality of independently-operable float valves arranged at different levels in said main tank and each being adapted to control the transfer of fuel from at least one of said storage tanks to said main tank, said float valves being rendered successively operative as the fuel level lowers in said main tank, whereby said storage tanks will be sequentially emptied as the fuel level in said main tank lowers.

CLARENCE L. JOHNSON.

REFERENCES CITED

The following references are of record in the file of this patent:

UNITED STATES PATENTS

| Number | Name | Date |
|---|---|---|
| 1,219,115 | Laurenti | Mar. 13, 1917 |
| 1,335,093 | Copetta | Mar. 30, 1920 |
| 1,763,394 | Folds et al. | June 10, 1930 |
| 1,776,877 | Yonkese | Sept. 30, 1930 |
| 1,856,077 | Koch | May 3, 1932 |
| 2,169,039 | Defendorf et al. | Aug. 8, 1939 |
| 2,264,219 | Ribbans | Nov. 25, 1941 |
| 2,275,471 | Samiran | Mar. 10, 1942 |
| 2,356,786 | Harman et al. | Aug. 29, 1944 |
| 2,394,431 | Curtis et al. | Feb. 5, 1946 |
| 2,394,506 | Woods | Feb. 5, 1946 |
| 2,409,245 | Black | Oct. 15, 1946 |
| 2,464,827 | Noyes | Mar. 22, 1949 |